(12) United States Patent
Blot et al.

(10) Patent No.: US 8,518,518 B2
(45) Date of Patent: Aug. 27, 2013

(54) ASSEMBLY OF FIBROUS ELEMENTS FOR OBTAINING A PART MADE OF A COMPOSITE

(75) Inventors: Philippe Blot, Nantes (FR); Julien Charles, Toulouse (FR); Mathieu Piana, Nantes (FR); Xavier Legrand, Roubaix (FR); Joel Besnier, Nantes (FR)

(73) Assignee: Airbus Operations SAS, Toulouse (FR)

( * ) Notice: Subject to any disclaimer, the term of this patent is extended or adjusted under 35 U.S.C. 154(b) by 269 days.

(21) Appl. No.: 13/056,994

(22) PCT Filed: Jul. 30, 2009

(86) PCT No.: PCT/FR2009/051535
§ 371 (c)(1), (2), (4) Date: Feb. 1, 2011

(87) PCT Pub. No.: WO2010/012960
PCT Pub. Date: Feb. 4, 2010

(65) Prior Publication Data
US 2011/0143085 A1    Jun. 16, 2011

(30) Foreign Application Priority Data
Aug. 1, 2008    (FR) .................................... 08 55322

(51) Int. Cl.
B32B 3/08    (2006.01)
B32B 7/04    (2006.01)

(52) U.S. Cl.
USPC ............................................ 428/102; 428/119

(58) Field of Classification Search
CPC ..... B29D 99/0014; B29C 70/22; B29C 70/24
USPC ............................................... 428/102, 119
See application file for complete search history.

(56) References Cited

U.S. PATENT DOCUMENTS

| | | | | |
|---|---|---|---|---|
| 4,299,871 A | * | 11/1981 | Forsch ........................... | 428/104 |
| 4,331,495 A | * | 5/1982 | Lackman et al. ............... | 156/93 |
| 4,628,846 A | | 12/1986 | Vives | |
| 4,992,317 A | * | 2/1991 | Chess et al. .................... | 428/102 |
| 5,429,853 A | | 7/1995 | Darrieux | |
| 5,789,061 A | * | 8/1998 | Campbell et al. ............. | 428/119 |

FOREIGN PATENT DOCUMENTS

| | | |
|---|---|---|
| EP | 0556089 A1 | 8/1993 |
| FR | 2687173 A1 | 8/1993 |
| FR | 2804975 A1 | 8/2001 |

OTHER PUBLICATIONS

International Search Report, dated Dec. 7, 2009, from corresponding PCT application.

* cited by examiner

*Primary Examiner* — Alexander Thomas
(74) *Attorney, Agent, or Firm* — Young & Thompson

(57) ABSTRACT

A fiber structure that can be embedded in a matrix for obtaining a piece made of composite material, includes a first fiber element having a first support surface, at least one L-shaped fiber element having a base that is flattened against the support surface of the first fiber element at a junction zone and a wing that is not flattened against the first fiber element, and another fiber element having one part flattened against the wing of the at least one L-shaped fiber element. The elements are assembled by tapping fibers from a second surface of the first fiber element so as to form loops, at least certain fibers being oblique relative to the second surface, in a plane that is perpendicular to the junction zone, wherein certain loops of the oblique fibers protrude to the outside of the outer surface of a wing of at least one L-shaped fiber element.

17 Claims, 3 Drawing Sheets

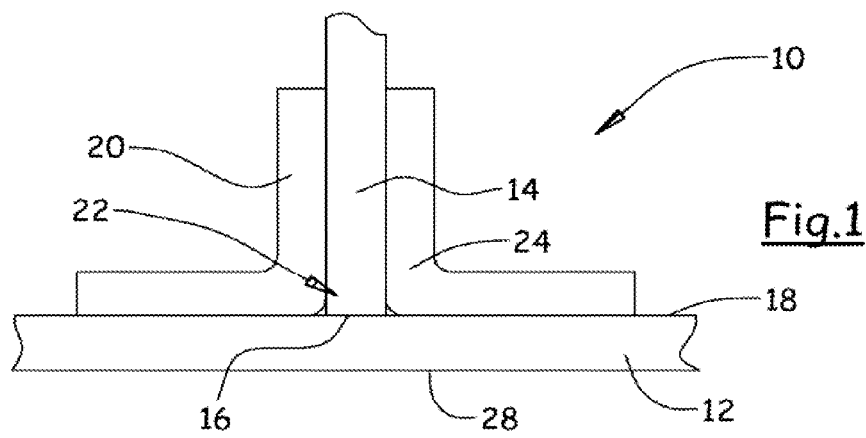
Fig. 1
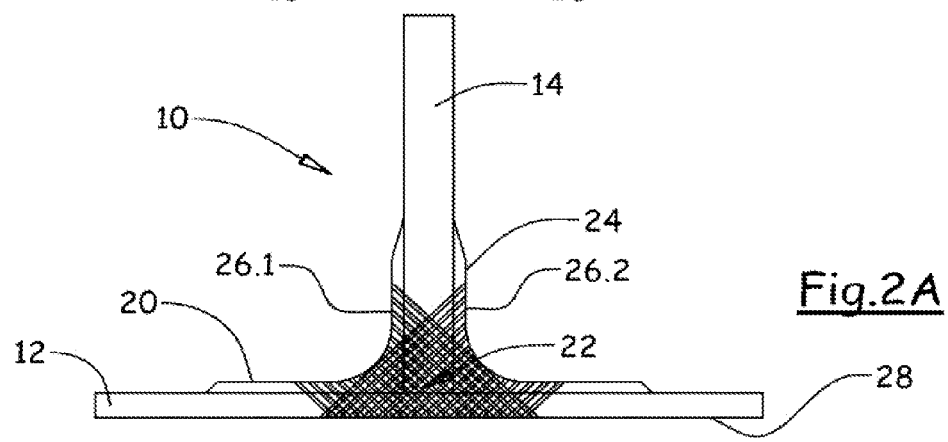
Fig. 2A
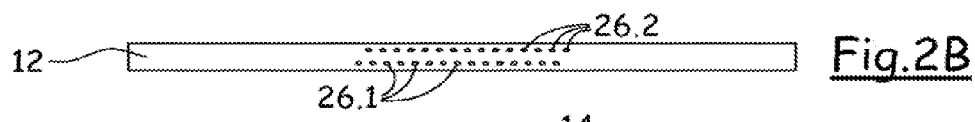
Fig. 2B
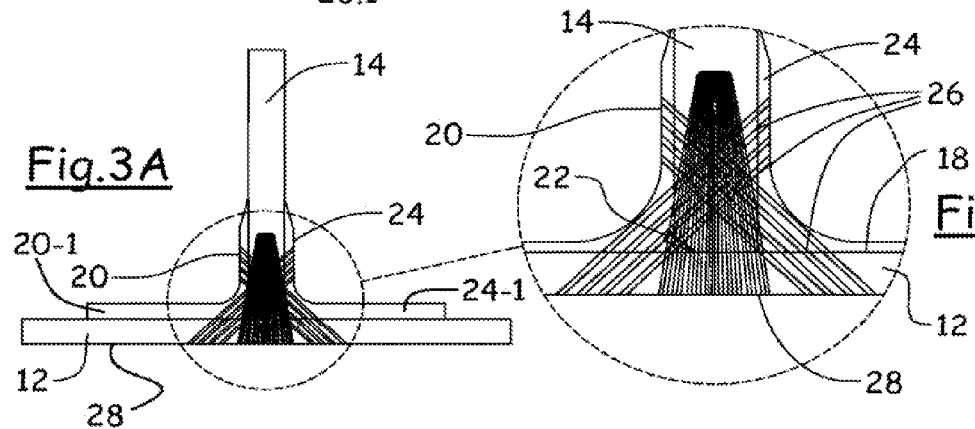
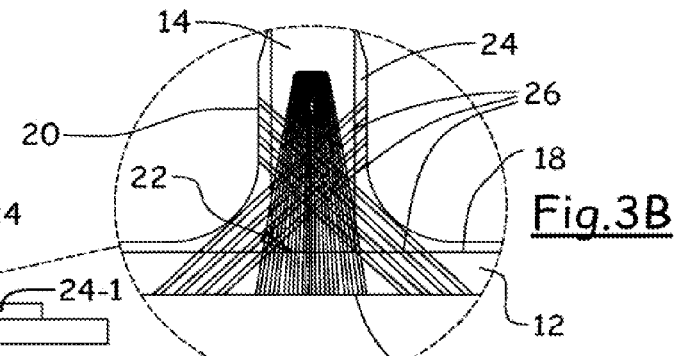
Fig. 3A
Fig. 3B
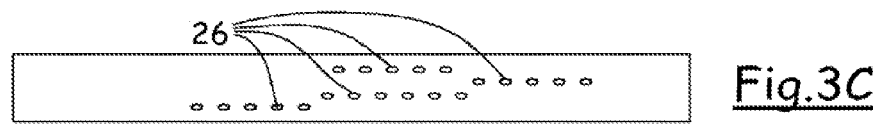
Fig. 3C

ASSEMBLY OF FIBROUS ELEMENTS FOR OBTAINING A PART MADE OF A COMPOSITE This invention relates to an assembly of fiber elements for obtaining a piece made of composite material as well as a piece made of composite material that comprises a fiber structure that is obtained by the assembly of fiber elements according to the invention.

BACKGROUND OF THE INVENTION

In a known manner, a piece made of composite material comprises a fiber structure that is embedded in a hardened matrix.

This invention relates more particularly to a fiber structure that is obtained by the assembly of several fiber elements.

The document EP-556089 describes a process whose purpose is to make two fiber elements integral, a first fiber element being applied by one of its edges against a first surface of a second fiber element. According to this document, to ensure the connection, transverse fibers that pass through said second element from the second surface of said second element are introduced by tapping a continuous thread. The thread loops that are obtained by tapping have a suitable length for penetrating the first element enough to ensure the connection. The document FR-2,687,173 describes another technique for assembly of at least two fiber elements: namely a first element in the form of a panel and at least one second element in the form of an angle bar, of which one wing rests against a first surface of the panel. According to this document for ensuring the connection, transverse fibers that pass through the first element from the second surface of said element are introduced by tapping a continuous thread. The thread loops that are obtained by tapping have a suitable length for adequately penetrating the second element. According to the variants, the transverse fibers that are provided outside of the zone that corresponds to the wing of the angle bar that is perpendicular to the panel can protrude on both sides of the structure, on the one hand at one of the surfaces of the panel and on the other hand at the surface of the angle bar that is parallel to the panel. According to another variant, the loops can be inclined and are not perpendicular to the surface of the panel.

Regardless of the variant, the ends of the loops that are arranged at the wing of the angle bar perpendicular to the panel are embedded in the structure and do not protrude.

The techniques of the prior art do not make it possible to ensure sufficient resistance depending on various mechanical stresses.

Actually, the pieces made of composite material that contain structures that are obtained according to the prior art have limited mechanical characteristics in terms of flexion because the junction zone is low in fibers and rich in resin and in terms of shearing because of the poor properties of carbon fibers in shearing.

In addition, the pieces made of composite material are subject to delamination at the junction zone.

SUMMARY OF THE INVENTION

The purpose of this invention is to remedy the drawbacks of the prior art by proposing an assembly of fiber elements making it possible to broaden the field of application of the assemblies obtained with the parts of the structure of an aircraft by optimizing their mechanical strength under various stresses.

For this purpose, the invention has as its object a fiber structure that can be embedded in a matrix for obtaining a piece made of composite material, whereby said structure comprises a first fiber element that comprises a first so-called support surface, at least one L-shaped fiber element comprising a part called a base that is flattened against said first support surface of the first fiber element at a junction zone and another part called a wing that is not flattened against said first fiber element, as well as another fiber element of which one part is flattened against the wing of said at least one L-shaped fiber element, whereby said elements are assembled by tapping fibers from the second surface of the first fiber element in such a way as to form loops, at least certain fibers being oblique relative to the surface of the first fiber element, in a plane that is perpendicular to the junction zone, characterized in that certain loops of said oblique fibers protrude to the outside of the outer surface of a wing of at least one L-shaped fiber element.

BRIEF DESCRIPTION OF THE DRAWINGS

Other characteristics and advantages will emerge from the following description of the invention, a description that is provided only by way of example, relative to the accompanying drawings, in which:

FIG. 1 is a transverse cutaway view that illustrates the different elements that are assembled for forming a fiber structure according to a first embodiment, FIG. 2A is a transverse cutaway view that illustrates the junction fibers according to a first implantation variant for the assembly of the structure of FIG. 1, FIG. 2B is a view that illustrates the tapping points according to the variant of FIG. 2A at the surface of one of the assembled elements, FIG. 3A is a transverse cutaway view that illustrates the junction fibers according to another implantation variant for the assembly of the structure of FIG. 1, FIG. 3B is a view that illustrates in detail the implantation of the junction fibers according to the variant of FIG. 3A, FIG. 3C is a view that illustrates the tapping points according to the variant of FIG. 3A at the surface of one of the assembled elements.

DETAILED DESCRIPTION OF THE PREFERRED EMBODIMENTS

Figure 4:
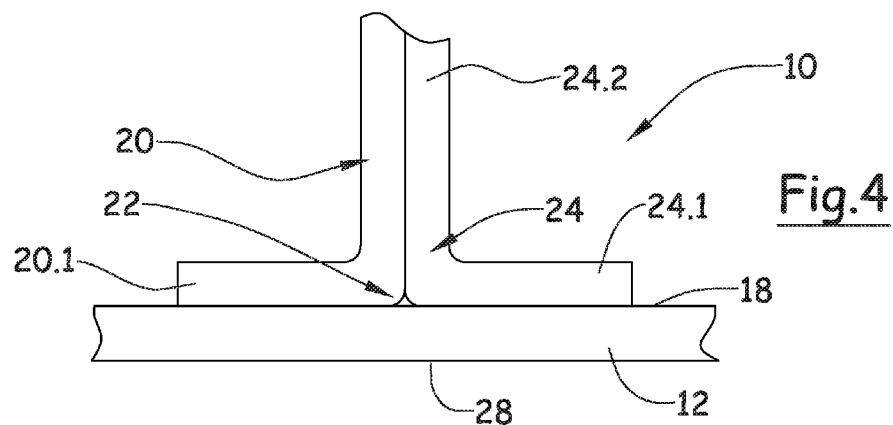
FIG. 4 is a transverse cutaway view that illustrates the different elements that are assembled to form a fiber structure according to a second embodiment.
Figure 5A:
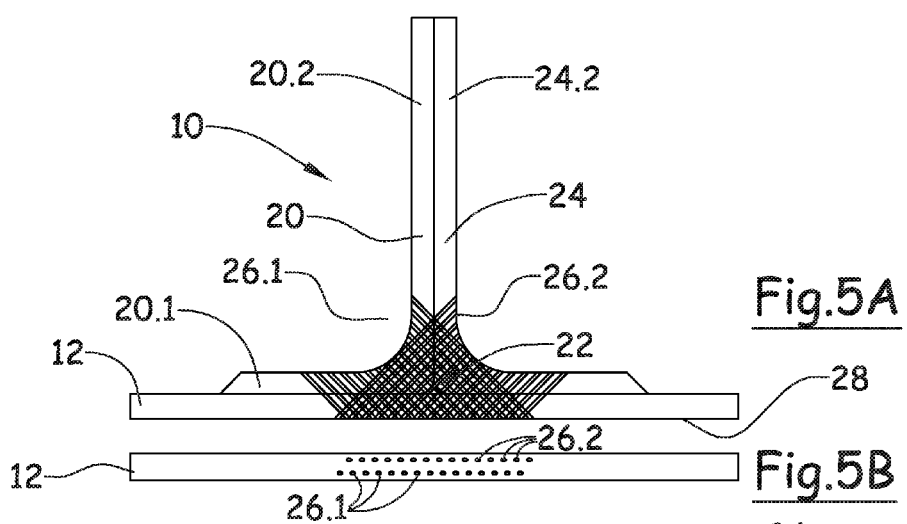
FIG. 5A is a transverse cutaway view that illustrates the junction fibers according to a first implantation variant for the assembly of the structure of FIG. 4.
Figure 5B:
FIG. 5B is a view that illustrates the tapping points according to the variant of FIG. 5A at the surface of one of the assembled elements.
Figure 6A:
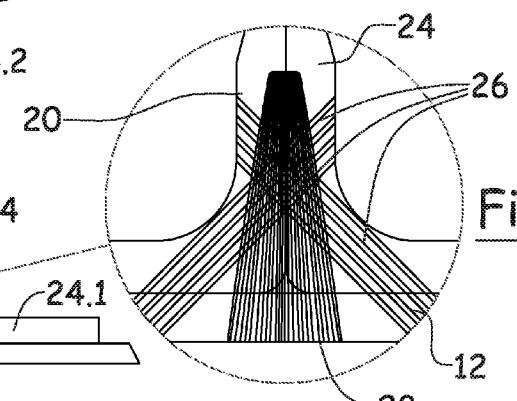
FIG. 6A is a transverse cutaway view that illustrates the junction fibers according to another implantation variant for the assembly of the structure of FIG. 4.
Figure 6B:
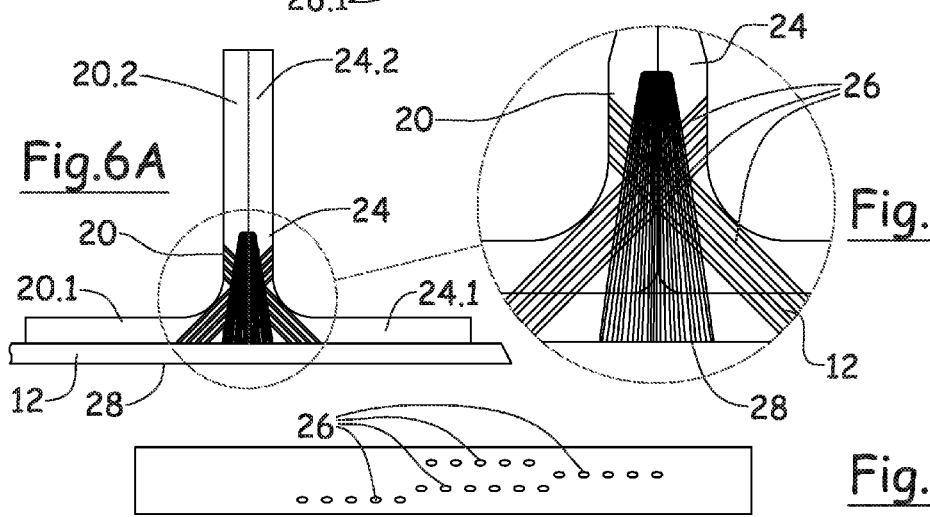
FIG. 6B is a view that illustrates in detail the implantation of the junction fibers according to the variant of FIG. 6A.
Figure 6C:
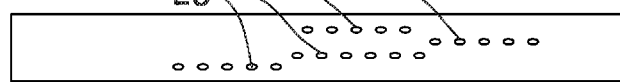
FIG. 6C is a view that illustrates the tapping points according to the variant of FIG. 6A at the surface of one of the assembled elements.

At 10, the different figures show a fiber structure that is obtained by the assembly of several non-coplanar, separate fiber elements. In each of the fiber elements, the fibers can be arranged in different ways based on the desired characteristics. Thus, the fibers can be arranged in an organized manner in at least two determined directions or can be arranged in a random manner.

According to a first variant that is illustrated in FIGS. 1, 2A, 2B, and 3A to 3C, this invention relates more particularly to the assembly of a first fiber element 12 and a second fiber element 14, whereby said second fiber element 14 is applied by one of its edges 16 against a first so-called support surface 18 of the first fiber element 12. This assembly makes it possible to obtain a T-shaped assembly, whereby the first element forms the cross-piece of the T, and the second element forms the base.

Hereinafter, an orthonormed reference point is defined in the following manner: the X- and Y-axes are contained in the cross-piece, whereby the Y-axis is common to the cross-piece and to the base, and the Z-axis is perpendicular to the X- and Y-axes.

When the elements 12 and 14 are orthogonal, the Z-axis corresponds to the direction of the base.

However, the invention is not limited to this embodiment, whereby the second element 14 cannot be orthogonal to the first element 12. In the same manner, the first element cannot be a panel and be curved or have a U-shaped profile. In all of the cases, the first panel comprises a support surface. The shapes and the sizes of the fiber elements are not presented in detail because they can vary to a large extent.

The assembly comprises at least one third fiber element 20 that comprises a first part called a base that is flattened against the first element 12 and a second part called a wing that is flattened against the second element 14 on both sides of the junction zone 22, whereby the third fiber element 20 has fibers that are oriented in a non-parallel manner to the junction zone, corresponding to the Y-axis, in such a way as to obtain a continuity of fibers on both sides of the junction zone.

Preferably, the assembly comprises a third fiber element 20 and a fourth fiber element 24 that are arranged on both sides of the second element 14, whereby the third and fourth fiber elements 20 and 24 each have a first part called a base that is flattened against the first element 12 and a second part called a wing that is flattened against the second element on both sides of the junction zone, corresponding to the Y-axis, whereby the third and fourth reinforcement elements have fibers that are oriented in a non-parallel manner to the junction zone 22 in such a way as to obtain a continuity of fibers on both sides of the junction zone.

The continuity of the fibers of the third and fourth elements 20, 24 on both sides of the junction zone makes possible a better transfer of force between the cross-piece and the base of the T and a greater resistance to the detachment and shearing.

Detachment is defined as stress that tends to separate the base of the T from the cross-piece. Shearing is defined as stress that tends to move the base of the T translationally relative to the cross-piece in the Y direction.

By way of indication, this configuration makes it possible to achieve for detachment maximum rupture forces that are 30% greater than for a structure without a fiber reinforcement element.

According to another variant that is illustrated in FIGS. 4, 5A, 5B, and 6A to 6C, the structure comprises the same fiber elements as the structure that is described above with the exception of the fiber element 14. Thus, it comprises a first fiber element 12, a second non-plane fiber element 20 in the shape of an L of which the first part, called base 20.1, is flattened against the support surface 18 of the first fiber element 12, and a third non-plane fiber element 24 in the shape of an L of which a first part, called base 24.1, is flattened against the support surface 18 of the first fiber element 12 and of which a second part, called wing 24.2, is flattened against the second part, called wing 20.2, of the second fiber element 20. The intersection of the base 20.1 and the wing 20.2, on the one hand, and that of the base 24.1 and the wing 24.2, on the other hand, are essentially parallel to the Y-axis and constitute the junction zone 22.

As above, this assembly makes it possible to obtain a T-shaped assembly, whereby the first element forms the cross-piece of the T, and the wings 20.2 and 20.4 form the base.

Based on the variants, the base may or may not be orthogonal to the cross-piece, and the first element cannot be a panel and be curved or have a U-shaped profile.

The L-shaped fiber elements 20 and 24 have fibers that are oriented in a non-parallel manner to the junction zone 22, corresponding to the Y-axis, in such a way as to obtain a continuity of fibers on both sides of the junction zone.

The continuity of the fibers of the fiber elements 20, 24 on both sides of the junction zone makes possible a better transfer of force between the cross-piece and the base of the T and a greater resistance to the detachment and shearing.

In all of the cases, the structure comprises a first fiber element that comprises a first so-called support surface, a second fiber element that comprises a part that is flattened against said first support surface of the first fiber element at a junction zone, and another part called a wing that is not flattened against said first fiber element, as well as a third fiber element of which one part is flattened against the wing of said second fiber element. According to the variants, the third element can have an edge that is flattened against the support surface 18 of the first element 12 as illustrated in FIG. 1 or the third element can have an L shape with a base that is flattened against the support surface of the first element 12 as illustrated in FIG. 4.

The shapes and the sizes of the fiber elements are not presented in detail because they can vary in a broad manner.

To achieve the assembly of various elements, through fibers 26 are introduced by tapping. Preferably, these through fibers 26 form U-shaped loops and extend from the second surface 28 of the first element, opposite to the support surface 18, up to an outer surface of the second element 14 and/or an outer surface of at least one fiber reinforcement element 20, 24, whereby an outer surface corresponds to a surface that is not in contact with at least one of the other elements of the fiber structure.

The through fibers 26 are relatively flexible so as to be able to form loops and to be tapped with a conventional tapping device.

Contrary to an orthogonal tapping (perpendicular to the second surface 28), the rectilinear parts of the loops are arranged in the fiber structure whereas the curved parts of the loops are not formed in the fiber structure but on the outside, whereby the tapping is protruding. This arrangement makes it possible to not disturb the arrangement of the fibers of the fiber structure too much.

According to another significant characteristic of the invention, at least certain fibers are oblique, relative to the surface 28, in an XZ plane that is perpendicular to the junction zone corresponding to the Y-axis, and the loops of some of these fibers protrude at the outer surface of at least one wing 20.2 and/or 24.2 of the fiber elements 20 and 24.

This characteristic makes it possible to prevent the appearance of delamination at the interface between the fiber elements 12, 20 and 24 or 12, 14, 20 and 24 at the junction zone 22.

This tapping configuration that protrudes at the outer surfaces of the wings makes it possible to achieve in shearing a force upon first damage that is equivalent to a non-reinforced structure, with the installation of the fiber reinforcement elements with an orthogonal tapping having a tendency to reduce it by 30%. This non-protruding tapping configuration also helps to improve the maximum detachment rupture force.

FIGS. 2A, 2B, 5A and 5B illustrate a first tapping configuration, a first series of rows of fibers 26.1 passing through the structure from the second surface 28 of the fiber element 12 to the outer surface of the fiber element 20, and a second series of rows of fibers 26.2 passing through the structure from the second surface 28 of the fiber element 12 to the outer surface of the fiber element 24.

Relative to the second surface 28 of the fiber element, in a plane that is perpendicular to the junction zone corresponding to the Y-axis, the fibers 26.1 of the first series form an angle that varies from 30 to 60°, preferably equal to 45°, and the fibers 26.2 of the second series form an angle that varies from 120° to 150°, preferably equal to 135°.

Preferably, certain fibers 26.1 that protrude at the outer surface of the wing of the fibrous element 20 are essentially tangent to the outer surface of the fiber element 24 at the junction zone, none being secant with the outer surface of the fiber element 24. In the same manner, certain fibers 26.1 that protrude at the outer surface of the wing of the fiber element 24 are essentially tangent to the outer surface of the fiber element 20, none being secant with the outer surface of the fiber element 20.

The rows of fibers are each arranged in planes that are parallel to one another in such a way that the fibers are not interlaced.

The through fibers 26 of the same row cannot be parallel to one another.

The two series of rows can be combined with an orthogonal or convergent tapping as illustrated in FIGS. 3A, 3B, 3C, 6A, 6B and 6C.

Thus, according to this embodiment, the fibers 26 are distributed in a first series of rows of fibers that are oriented according to an angle that varies from 30° to 60° relative to the second surface 28, in a second series of rows of fibers that are oriented according to an angle that varies from 120° to 150° relative to the second surface 28, and in a third series of fibers that are essentially orthogonal or convergent.

These different configurations make it possible to considerably improve the mechanical behavior in terms of shearing using L-shaped fiber elements. The tapping configuration makes it possible to improve the mechanical behavior upon detachment arising from the use of L-shaped fiber elements.

In terms of shearing, if the force upon first damage of a structure with and without tapping is compared:

The improvement provided is on the order of +250% in the case of a structure according to FIG. 1, and The improvement provided is on the order of +260% in the case of a structure according to FIG. 4, whereby this comparison is implemented for structures with the same mass.

For tapping, a tapping device as described in the document EP-556089 is used, whereby this device can be inclined to achieve inclined fiber rows.

Figure 7A:
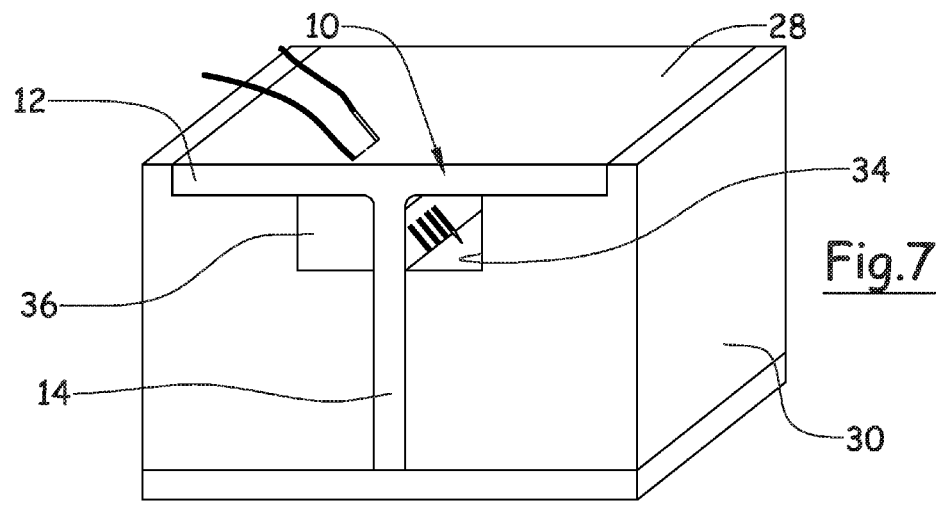
FIGS. 7A to 7C are perspective views that illustrate different stages of a variant of the assembly process according to the invention.
Figure 7B:
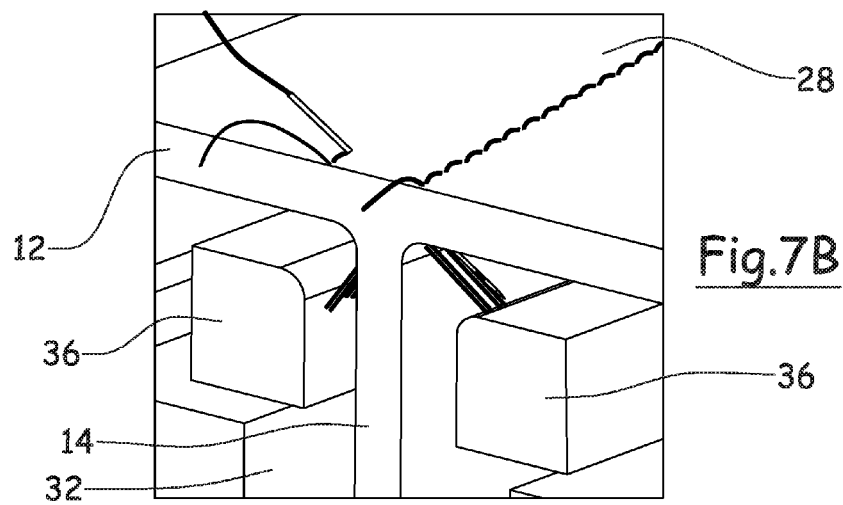

The device for holding preforms is described in FIGS. 7A and 7B. It comprises a rigid part 30 that comprises a hollow shape 32 that can receive the elements of the structure of fibers and can hold them prior to tapping. After the installation of the various elements, the second surface 28 of the first fiber element 12 is released and oriented in the direction of the tapping device.

On both sides of the second element 14, at the angle that is formed by said element 14 and the first element 12, this rigid part 30 comprises a recess 34 that is filled with a block 36 of a material that is flexible enough to be pierced by a tapping needle and rigid enough to hold the loops of the fibers 26. By way of example, the blocks 36 are made of polystyrene foam.

To better explain the holding of the loops during tapping, the tapping operation is illustrated in FIG. 7A with a transparent block 36 and in FIG. 7b with blocks 36 that are separated from the fiber structure to show the holding of the loops in the blocks 36.

Figure 7C:
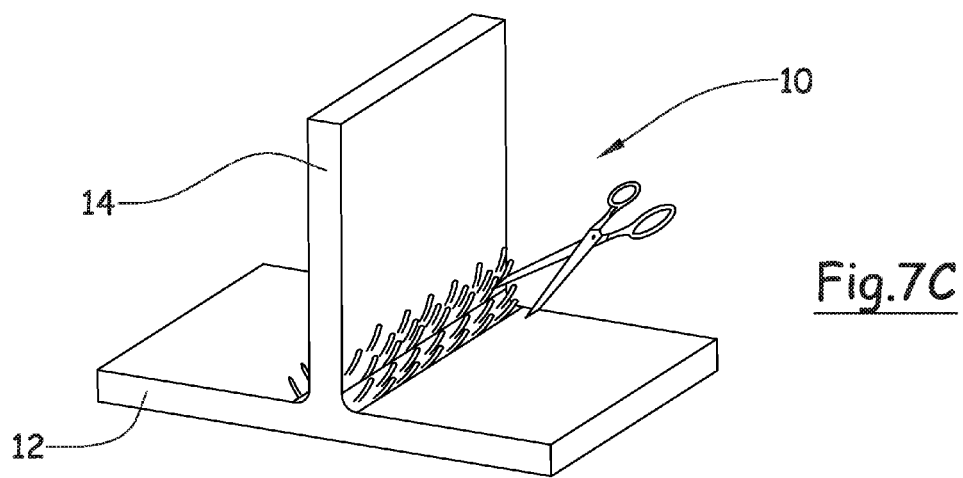

After the tapping operation, the assembled fiber structure 10 as well as the blocks 36 are removed from the device. Next, the fibers 26 are cut so as to separate the structure from the blocks and to obtain a structure 10 that is assembled using through fibers 26, as illustrated in FIG. 7C.

The invention claimed is:

1. A fiber structure that can be embedded in a matrix for obtaining a piece made of composite material, whereby said structure comprises:

a first fiber element (12) that comprises a first support surface (18);

at least one L-shaped fiber element (20) comprising a base that is flattened against said first support surface (18) of the first fiber element (12) at a junction zone (22) and a wing that is not flattened against said first fiber element (12); and another fiber element of which one part is flattened against the wing of said at least one L-shaped fiber element (20), said elements assembled by tapping fibers (26) from the second surface (28) of the first fiber element (12) in such a way as to form loops, at least certain fibers (26) being oblique relative to the surface (28) of the first fiber element (12), in a plane that is perpendicular to the junction zone (22), wherein certain loops of said oblique fibers (26) protrude to the outside of the outer surface of the wing (20.2) of the at least one L-shaped fiber element (20).

2. The fiber structure according to claim 1, wherein the at least one L-shaped fiber element comprises two L-shaped fiber elements (20, 24) whose wings are flattened against one another.

3. The fiber structure according to claim 2, wherein the fibers comprise a first series of rows of fibers (26.1) passing through said structure from the second surface (28) of the first fiber element (12) to the outer surface of the wing of a first L-shaped fiber element (20), and a second series of rows of fibers (26.2) passing through the structure from the second surface (28) of the first fiber element (12) to the outer surface of the wing of a second L-shaped fiber element (24).

4. The fiber structure according to claim 3, wherein the fibers (26.1) of the first series of rows form an angle that varies from 30° to 60° relative to the second surface (28) of the first fiber element (12), and the fibers (26.2) of the second series of rows form an angle that varies from 120° to 150° relative to the second surface (28) of the first fiber element (12).

5. The fiber structure according to claim 4, wherein certain fibers (26.1) that protrude at the outer surface of the wing of a first L-shaped fiber element (20) are essentially tangent to the outer surface of the second L-shaped fiber element (24) at the junction zone, none being secant with the outer surface of said second L-shaped fiber element (24).

6. The fiber structure according to claim 4, wherein certain fibers (26.1) that protrude at the outer surface of the wing of a first L-shaped fiber element (20) are essentially tangent to the outer surface of the second L-shaped fiber element (24) at the junction zone, none being secant with the outer surface of said second L-shaped fiber element (24), and wherein certain fibers (26.1) that protrude at the outer surface of the wing of said second L-shaped fiber element (24) are essentially tangent to the outer surface of said first L-shaped fiber element (20), none being secant with the outer surface of said first L-shaped fiber element (20).

7. The fiber structure according to claim 4, wherein the fibers further comprise a third series of fibers (26) that are essentially orthogonal to the second surface (28) of the first fiber element (12) or convergent with respect to each other.

8. The fiber structure according to claim 3, wherein certain fibers (26.1) that protrude at the outer surface of the wing of a first L-shaped fiber element (20) are essentially tangent to the outer surface of the second L-shaped fiber element (24) at the junction zone, none being secant with the outer surface of said second L-shaped fiber element (24).

9. The fiber structure according to claim 8, wherein the fibers further comprise a third series of fibers (26) that are essentially orthogonal to the second surface (28) of the first fiber element (12) or convergent with respect to each other.

10. The fiber structure according to claim 3, wherein certain fibers (26.1) that protrude at the outer surface of the wing of a first L-shaped fiber element (20) are essentially tangent to the outer surface of the second L-shaped fiber element (24) at the junction zone, none being secant with the outer surface of said second L-shaped fiber element (24), and wherein certain fibers (26.1) that protrude at the outer surface of the wing of said second L-shaped fiber element (24) are essentially tangent to the outer surface of said first L-shaped fiber element (20), none being secant with the outer surface of said first L-shaped fiber element (20).

11. The fiber structure according to claim 10, wherein the fibers further comprise a third series of fibers (26) that are essentially orthogonal to the second surface (28) of the first fiber element (12) or convergent with respect to each other.

12. The fiber structure according to claim 3, wherein the fibers further comprise a third series of fibers (26) that are essentially orthogonal to the second surface (28) of the first fiber element (12) or convergent with respect to each other.

13. The fiber structure according to claim 2, wherein the two L-shaped fiber elements (20, 24) are arranged on both sides of another fiber element (14) having an edge (16) is flattened against the support surface (18) of the first fiber element (12).

14. The fiber structure according to claim 1, wherein the at least one L-shaped fiber element comprises two L-shaped fiber elements (20, 24) that are arranged on both sides of another fiber element (14) having an edge (16) that is flattened against the support surface (18) of the first fiber element (12).

15. The fiber structure according to claim 14, wherein the fibers comprise a first series of rows of fibers (26.1) passing through said structure from the second surface (28) of the first fiber element (12) to the outer surface of the wing of a first L-shaped fiber element (20), and a second series of rows of fibers (26.2) passing through the structure from the second surface (28) of the first fiber element (12) to the outer surface of the wing of a second L-shaped fiber element (24).

16. A device for the assembly of a T-shaped fiber structure according to claim 1, comprising:
a rigid part (30) that comprises a hollow shape (32) that can receive the fiber elements of said structure and can hold them,
wherein, on both sides of the base of the T of the fiber structure, at the angle that is formed by the base and the cross-piece of said fiber structure, said rigid part (30) comprises a recess (34) that is filled with a block (36) made of material that is flexible enough to be pierced by a tapping needle and rigid enough to hold fiber loops (26).

17. A piece made of composite material that comprises a fiber structure that is embedded in a matrix, said structure comprising a first fiber element (12) that comprises a first support surface (18), at least one L-shaped fiber element (20) comprising a base part that is flattened against said first support surface (18) of the first fiber element (12) at a junction zone (22) and a wing that is not flattened against said first fiber element (12), as well as another fiber element of which one part is flattened against the wing of said at least one L-shaped fiber element (20), whereby said elements are assembled by tapping of fibers (26) from the second surface (28) of the first fiber element (12) in such a way as to form loops, at least certain fibers (26) being oblique relative to the surface (28) of the first fiber element (12), in a plane that is perpendicular to the junction zone (22), wherein certain loops of said oblique fibers (26) protrude at the outer surface of a wing (20.2) of at least one L-shaped fiber element (20).

* * * * *